United States Patent
Patberg (10) Patent No.: US 7,389,586 B2
(45) Date of Patent: Jun. 24, 2008

(54) METHOD FOR PRODUCING A Y-SHAPED NODE STRUCTURE FOR THE SUPPORTING FRAME OF A MOTOR VEHICLE

(75) Inventor: Lothar Patberg, Aachen (DE)

(73) Assignee: Thyssenkrupp Steel AG, Duisburg (DE)

( * ) Notice: Subject to any disclaimer, the term of this patent is extended or adjusted under 35 U.S.C. 154(b) by 0 days.

(21) Appl. No.: 10/507,922

(22) PCT Filed: Apr. 4, 2003

(86) PCT No.: PCT/EP03/03510

§ 371 (c)(1),
(2), (4) Date: Aug. 15, 2005

(87) PCT Pub. No.: WO03/084802

PCT Pub. Date: Oct. 16, 2003

(65) Prior Publication Data

US 2006/0001285 A1    Jan. 5, 2006

(30) Foreign Application Priority Data

Apr. 9, 2002 (DE) .................. 102 15 441

(51) Int. Cl.
*B21D 53/88* (2006.01)
*B21D 47/00* (2006.01)
(52) U.S. Cl. ..................... 29/897.2; 29/897.3
(58) Field of Classification Search ............ 29/897, 29/897.312, 897.3, 897.33, 890.149, 890.148, 29/897.2, 401.1, 425; 52/745.19
See application file for complete search history.

(56) References Cited

U.S. PATENT DOCUMENTS

| 1,972,309 | A | | 9/1934 | McMurchy | 113/116 |
|---|---|---|---|---|---|
| 2,193,298 | A | * | 3/1940 | Schottenberg | 29/897.312 |
| 2,387,134 | A | * | 10/1945 | Fox | 29/897.33 |
| 4,694,547 | A | * | 9/1987 | Broussard | 29/890.149 |
| 4,988,230 | A | | 1/1991 | Banthia et al. | |
| 5,226,696 | A | | 7/1993 | Klages et al. | 296/203 |
| 5,226,698 | A | | 7/1993 | Harrison | 297/485 |
| 6,361,244 | B1 | | 3/2002 | Ni et al. | 403/393 |
| 6,539,604 | B2 | | 4/2003 | Patelczyk | |
| 2001/0042986 | A1 | | 11/2001 | Patelczyk | 296/29 |
| 2006/0029462 | A1 | | 2/2006 | Patberg | 403/171 |

FOREIGN PATENT DOCUMENTS

| DE | 894508 | 10/1953 |
|---|---|---|
| DE | 3726079 A1 | 2/1989 |
| DE | 19724037 A1 | 12/1998 |
| DE | 10215442 A1 | 11/2003 |
| EP | 0478551 | 4/1992 |

(Continued)

*Primary Examiner*—John C Hong
(74) *Attorney, Agent, or Firm*—Proskauer Rose LLP (57) ABSTRACT

A y-shaped gusset structure can be used, for example, in a support frame for vehicles. The gusset structure includes two hollow sections. The first hollow section includes at least one flat side, has been cut through along its circumference except for a web situated in the flat side, and has been bent open around this web. The face of the second hollow section has been inserted into the facing ends of the first hollow section, which facing ends have been created by the process of cutting and bending open, wherein the edge regions of the ends are integrally connected with the first hollow section.

5 Claims, 5 Drawing Sheets

FOREIGN PATENT DOCUMENTS

| | | |
|---|---|---|
| EP | 0568213 A1 | 11/1993 |
| EP | 0568251 A1 | 11/1993 |
| GB | 668922 A | 3/1952 |
| GB | 1559178 | 1/1980 |
| JP | 8061329 | 3/1996 |
| WO | WO03/084800 A1 | 10/2003 |

\* cited by examiner

METHOD FOR PRODUCING A Y-SHAPED NODE STRUCTURE FOR THE SUPPORTING FRAME OF A MOTOR VEHICLE

BACKGROUND OF THE INVENTION

The invention relates to a y-shaped gusset structure of a support frame for vehicles as well as a method for its production.

Various designs of gusset structures for vehicle support frames are known from practical application. The crash safety of the vehicle support frame is decisively determined by its geometry, i.e. by the position of the elements of the support frame—as a rule hollow sections —relative in relation to each other, and by the stiffness of the gusset structures. In particular in the region where the front or rear longitudinal member is connected to the passenger compartment, which region represents a crash zone which is particularly subjected to loads, preferably y-shaped gusset structures are used in order to achieve a favourable distribution of the longitudinal forces, which during a crash act on the passenger compartment. In order to minimise the danger of the hollow sections collapsing in the region of the gusset structure, said gusset structure has to be designed so as to provide maximum stiffness. To this effect, conventional design solutions require the use of additional reinforcement elements; a solution which leads to an undesirable increase in the overall weight of the vehicle support frame. In particular with the use of interior high-pressure metal forming technology, which saves weight due to the lack of welding flanges, adequate rigidity of the gusset structure can only be achieved with the use of support plates. This partly negates the weight gain achieved by this solution.

EP 0 568 251 B1 describes a support frame for vehicles, which support frame comprises several subassemblies based on hollow sections. The hollow sections are interconnected by way of various types of gusset structures in stretched or rectangular positions. The connection of sections which are arranged at right angles in relation to each other, for example the connection between the B-pillar and the lateral sill, is implemented by way of a T-shaped gusset structure. According to an embodiment of such a T-gusset, one end of a first hollow section of rectangular cross section comprises two sections, arranged flush with each other and bent by 90°, with said sections comprising a C-shaped cross section, wherein a second hollow section can be placed against said sections and welded to them.

A gusset structure which is similar to the above embodiment is known from DE 37 26 079 A1. This printed publication describes a door frame construction for utility vehicles, in particular for buses or coaches. The central component of this design is also made up of a T-shaped gusset structure for connecting two hollow sections arranged at a right angle in relation to each other. In this arrangement, the opposing lateral surfaces of one of the hollow sections, at their ends facing the other sections, have been longitudinally cut open in such a way that two U-shaped connection pieces are created which can be formed to constitute a desired transition contour and which can be placed against the section to be connected. In both the above-mentioned printed publications, the respectively described frame structures are largely or exclusively based on T-shaped gusset structures. There is no description of the connection of hollow sections by way of y-gusset structures which are advantageous as far as their crash behaviour is concerned.

SUMMARY OF THE INVENTION

It is thus the object of the invention to create a gusset structure of the type mentioned in the introduction which comprises maximum stiffness and does not require additional support elements, as well as to create a method for its production.

This object is met by a gusset structure of the type mentioned in the introduction in that the gusset structure comprises two hollow sections, of which the first hollow section comprises at least one flat side and along its circumference has been cut through except for a web situated in the flat side, and has been bent open around this web, and in that the face of the second hollow section has been inserted into the facing ends of the first hollow section, which facing ends have been created by the above-mentioned process of cutting and bending-open, wherein the edge regions of the first hollow section are integrally connected to the second hollow section.

This arrangement creates a particular advantage in that the lateral walls of the second hollow section, which lateral walls have been inserted into the ends of the first hollow section, in the way of bulkhead plates reinforce the gusset structure from the inside, thus ensuring optimal stiffness of the gusset structure. This minimises the danger of the hollow sections collapsing in the region of the gusset structure as a result of a crash. Consequently, it is no longer necessary to affix additional components for reinforcing the gusset structure, a feature which contributes to a reduction in the overall weight of the support frame.

In an advantageous embodiment of the invention, the contours of the two hollow sections are adjacent to each other as far as possible without any gap. This results in an improved distribution of the longitudinal forces which in the case of a crash act on the gusset structure onto the hollow sections bifurcating from the gusset structure. In particular, the occurrence of localised load peaks is prevented since the hollow sections are adjacent to each other in a positive-locking manner.

According to a further embodiment of the invention, the opposite ends of the first hollow section comprise bent open edge regions which are opposite the web, which edge regions flatly rest against the second hollow section. These form easily-useable connection zones for connecting the two hollow sections by welding, soldering or some other connection process.

If the gusset structure is used in regions of the vehicle support frame, which regions are particularly exposed to loads, it is advantageous if, on the sides adjoining the flat side, at the positions where the first hollow section has been cut, in each instance an essentially rectangular strip has been cut out symmetrically in relation to the separation cut. This largely prevents any load-induced stress concentration in the corners of the facing ends of the first hollow section. In this context it has been shown to be particularly advantageous if the cut-out strip comprises rounded corners. If the gusset structure is used in regions of the vehicle support frame which are subjected to lesser loads, this design feature can be done without in the interest of economical production.

Furthermore, the above-mentioned object is met by a method for producing the gusset structure according to the invention, involving the following steps:

a) Cutting open the first hollow section along its circumference except for a web situated in the flat side;

b) Bending up the first hollow section, which has been partly cut open, around the web positioned in the flat side;

c) Inserting the second hollow section into the facing ends of the first hollow section, which ends have resulted from being cut and bent up; and d) Integral connection of the second hollow section with the first hollow section at its edge regions.

As a result of the first hollow section being bent up, the geometry of the gusset structure can be variably designed without excessive manufacturing-technology expense. This arrangement provides a particular advantage in that, as a result of the bending procedure, small angles between the ends of the cut-open first hollow section can also be achieved. This has a positive effect on the loadability of the gusset structure, since the longitudinal forces which occur in the case of a crash need to be deflected only slightly if the angle is small.

A further embodiment of the method according to the invention provides for the first hollow section to be formed along part of its circumference before it is cut open, and for the separating cut to be made through the middle of the outward bulge. In this way, by means of the cutting operation, the edge regions which protrude at facing ends of the first hollow section can be made in a suitable way, with said edge regions directly adjoining the walls of the second hollow section, thus forming favourable geometric conditions for integral connection of the two hollow sections and thus also in relation to their load-bearing ability. In this arrangement, the outward bulge is preferably made in the first hollow section by interior high-pressure metal forming.

A further advantageous embodiment of the method provides for the first hollow section to be cut open by means of laser beam cutting. This results in precisely cut edges as a result of which integral connection of the hollow sections is also facilitated.

The hollow sections can be connected by welding or soldering, wherein the use of laser beam technology for welding or soldering has again been proven to be particularly advantageous.

BRIEF DESCRIPTION OF THE DRAWING

Below, the invention is explained in more detail with reference to a drawing which shows one embodiment, as follows.

DETAILED DESCRIPTION OF THE INVENTION

Figure 1:
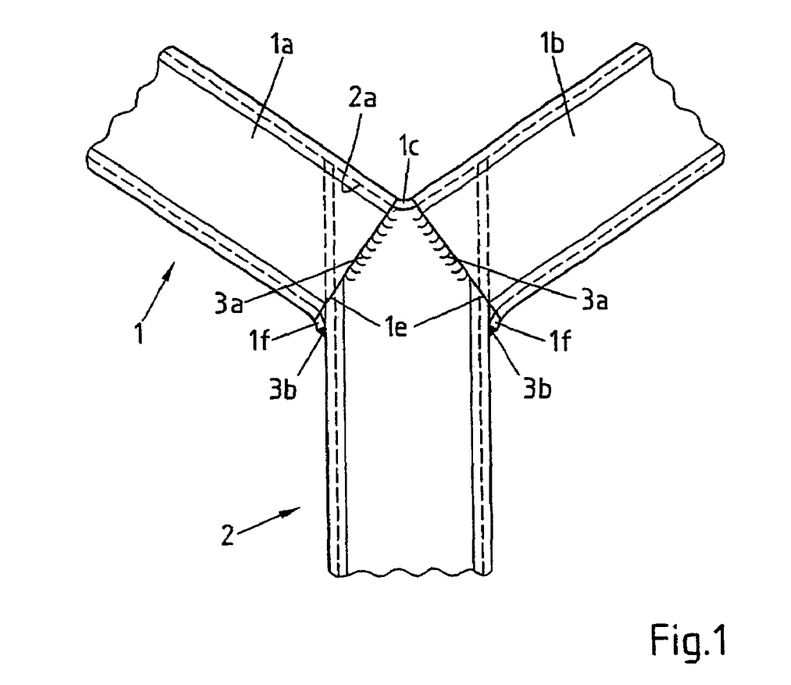
FIG. 1 a top view of a y-shaped welded gusset structure of a support frame for vehicles, which gusset structure comprises hollow sections.
Figure 2:
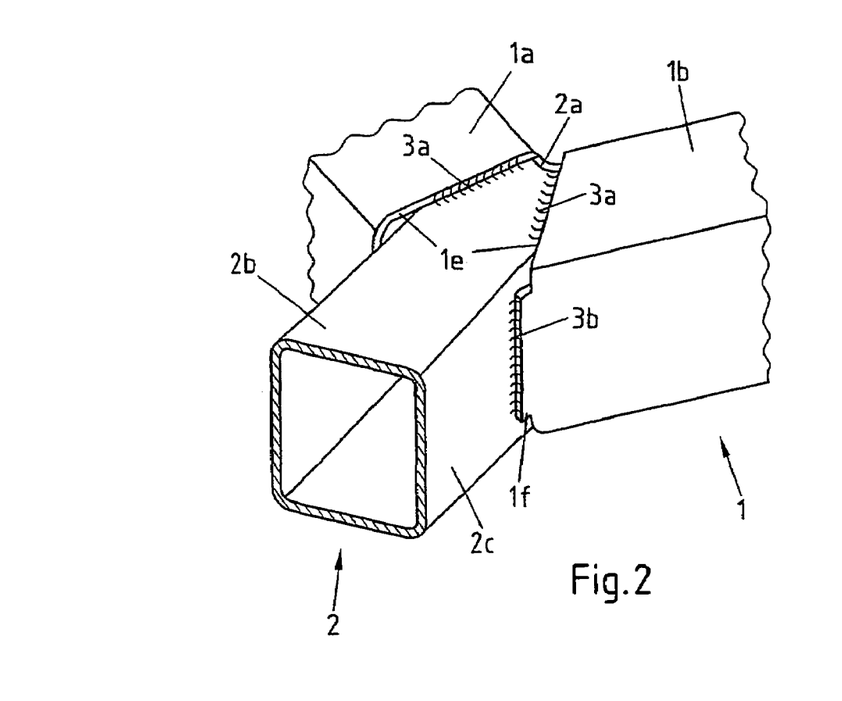
FIG. 2 a perspective view of the gusset structure according to FIG. 1.
Figure 3:
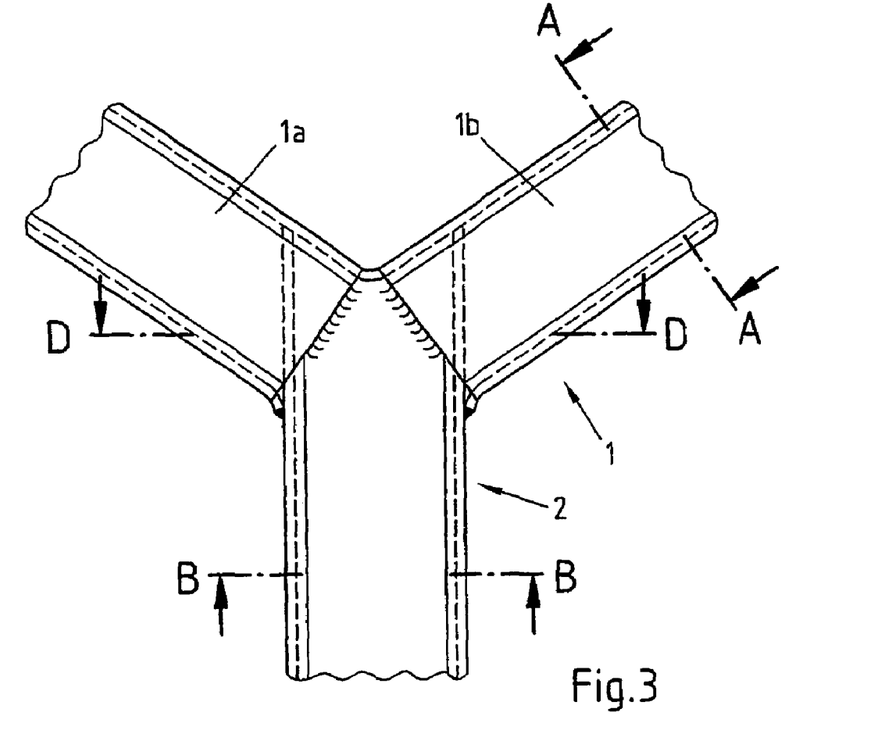
FIG. 3 a top view of the gusset structure according to FIG. 1, with the weld seams not being shown.
Figure 4:
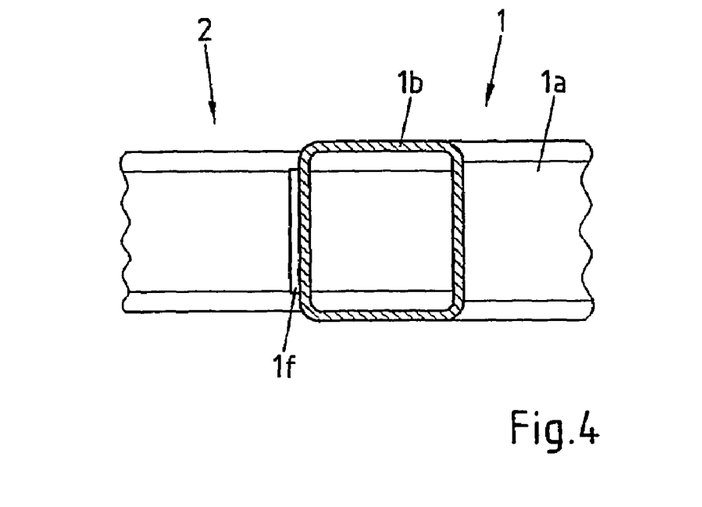
FIG. 4 a cross section, along the line A-A in FIG. 3, of the gusset structure of FIG. 3.
Figure 5:
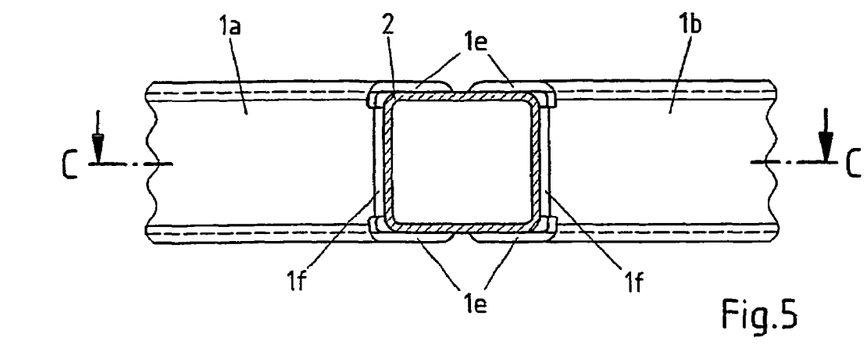
FIG. 5 a cross section, along the line B-B in FIG. 3, of the gusset structure of FIG. 3.
Figure 6:
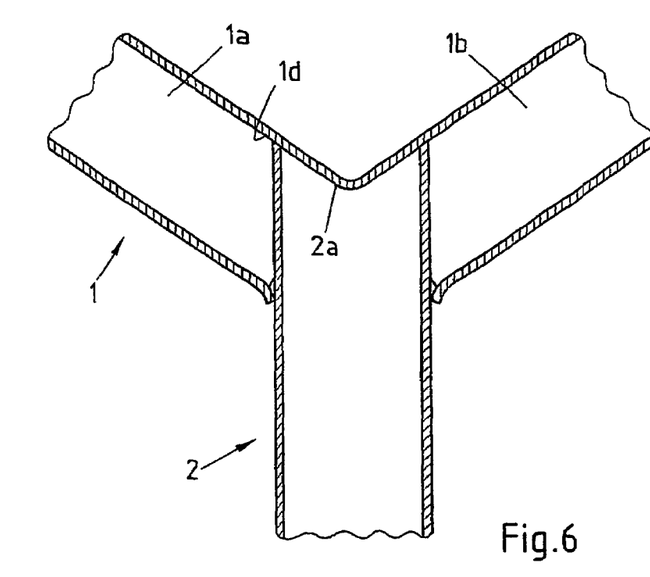
FIG. 6 a cross section, along the line C-C in FIG. 5, of the gusset structure of FIG. 3.
Figure 7:
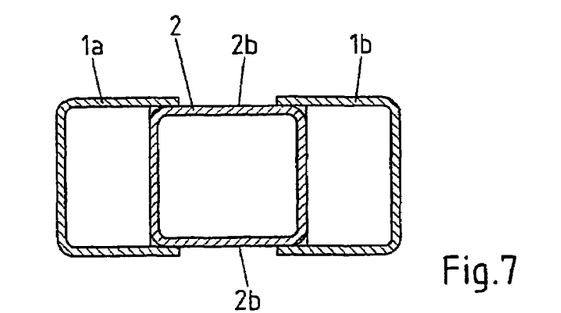
FIG. 7 a cross section, along the line D-D in FIG. 3, of the gusset structure of FIG. 3.

The gusset structure shown in top view in FIG. 1 comprises two hollow sections 1, 2 of essentially square cross section, which hollow sections 1, 2 together form a y-shape and are interconnected having positive and integral fit. Along its circumference, the first hollow section has been cut open except for a web 1c and has been bent up around the web 1c so that two facing ends 1a, 1b of the hollow section 1 are created. Into the ends 1a, 1b is inserted the end of the further hollow section 2, which end comprises a v-shaped incision, in such a way that the face 2a of said hollow section 2 adjoins the mutual inside 1d of the two ends 1a, 1b of the first hollow section 1 as far as possible without any gap. The two ends 1a, 1b comprise bent open edge regions 1f which are opposite the web 1c, as well as adjoining recessed flat edge regions 1e, wherein the bent open edge regions 1f rest against the lateral surfaces 2c while the recessed flat edge regions 1e rest against the top and bottom 2b of the hollow section 2. On the recessed flat edge regions 1e, the two ends 1a, 1b of the hollow section 1 are connected to the top and bottom 2b of the hollow section 2 by means of weld seams 3a. On the bent open edge regions 1f, the ends 1a, 1b of the hollow section 1 are connected by weld seams 3b to the lateral surfaces 2c of the hollow section 2.

FIGS. 4 to 7 show various cross sections of the gusset structure. For reasons of clarity, the weld seams 3a, 3b are not shown in these drawings.

Figure 8A:
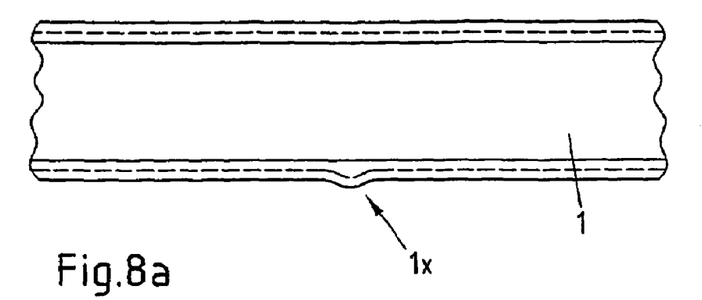
FIG. 8a-e the method-related steps for producing the gusset structure of FIG. 1.
Figure 8B:
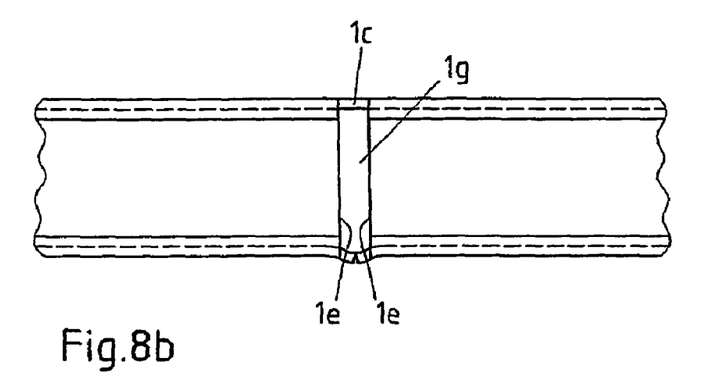
Figure 8C:
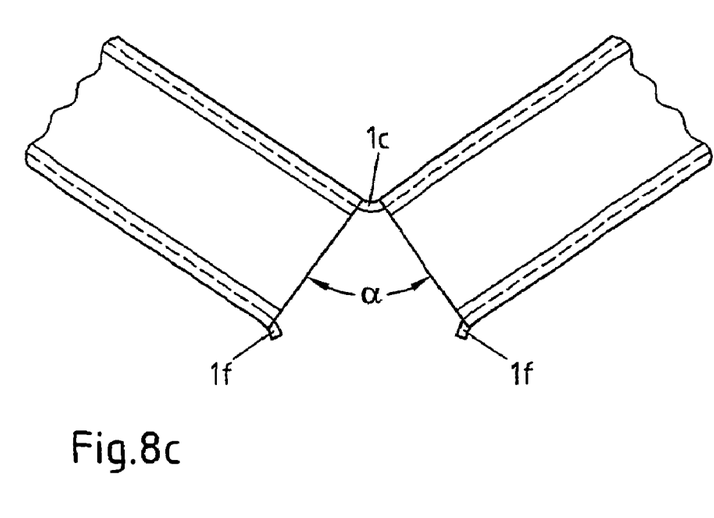
Figure 8D:
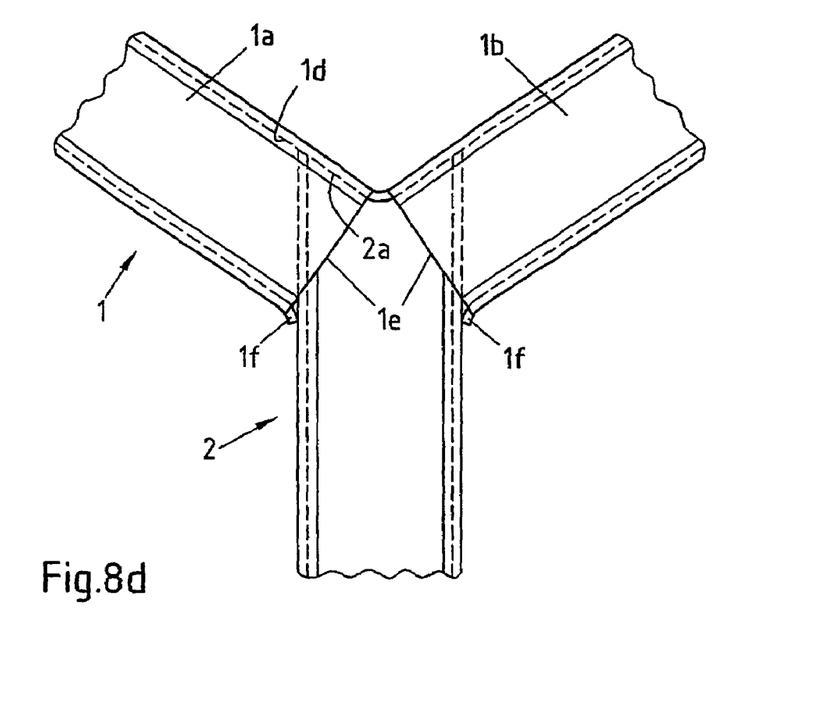
Figure 8E:
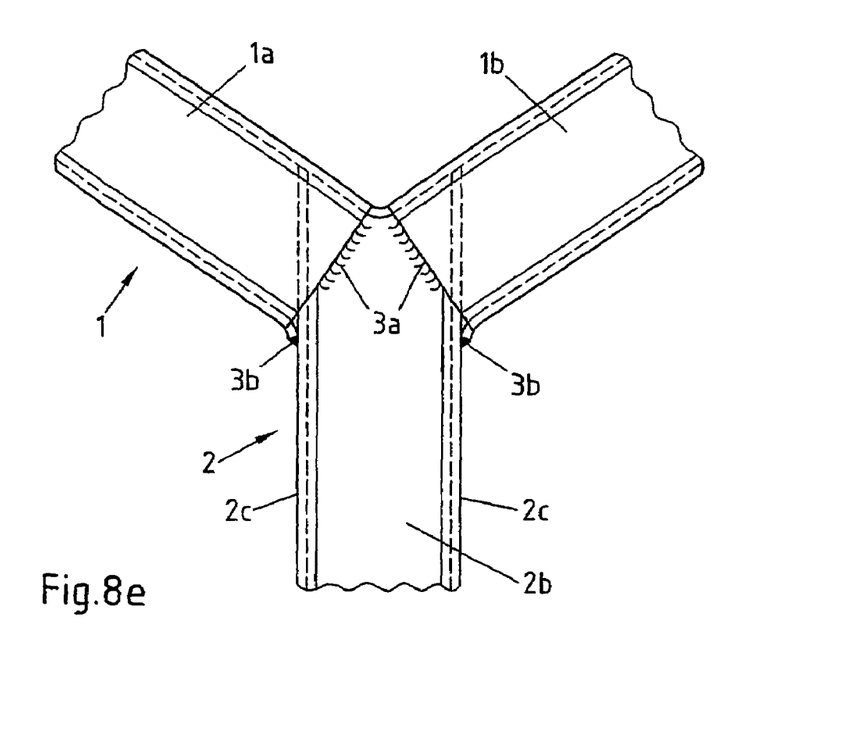

FIG. 8a-e shows the individual process steps for producing the gusset structure. As shown in FIG. 8a, first, by interior high-pressure metal forming, an outward bulge 1x is made in a lateral area of the hollow section 1 along the circumference of said hollow section 1. The hollow section 1 is then cut open around its circumference, except for a web 1c, preferably by laser beam cutting, with said web 1c being opposite the outward bulge 1x. The cutting tool is guided in such a way that firstly the separating cut is placed through the middle of the outward bulge 1x and secondly on each of the sides adjoining the web an essentially rectangular strip 1g is cut out symmetrical in relation to the separating cut (FIG. 8b). In this way, bent open edge regions 1f are created on the side opposite the web 1c, and recessed flat edge regions 1e are created on the sides adjoining the web. Subsequently, the hollow section 1 is bent up at a bending angle a around the web 1c (FIG. 8c). In the next step the hollow section 2 is inserted into the ends which have resulted from cutting open and then bending up the facing ends 1a, 1b of the hollow section 1 (FIG. 8d), so that the face 2a of the hollow section 2, which face 2a has been contoured according to the bending angle α, rests against the mutual inside 1d of the two ends 1a, 1b as far as possible without any gap. In the last step, shown in FIG. 8e, the upper and lower recessed edge regions 1e (see FIG. 5) of the facing ends 1a, 1b of the hollow section 1 are welded together with the top and bottom 2b of the hollow section 2. Furthermore, at the protruding edge regions 1f the ends 1a, 1b are welded to the lateral surfaces 2c of the hollow section 2.

The invention claimed is:

1. A method for producing a Y-shaped gusset structure, comprising:

a) cutting open a first hollow section along its circumference except for a web situated in a flat side;

b) bending up the first hollow section, which has been partly cut open, around the web positioned in the flat side to form facing ends of the first hollow section and a bending angle;

c) inserting one end of a second hollow section into the facing ends of the first hollow section;

d) integrally connecting the one end of the second hollow section with edge regions of the facing ends of the first hollow section to form the Y-shaped gusset structure; and e) before it is cut open, the first hollow section is given an outward bulge around part of its circumference, and in that a separating cut is made through the middle of said outward bulge.

2. The method according to claim 1, wherein the outward bulge is made in the first hollow section by interior high-pressure metal forming.

3. The method according to claim 1, wherein the cutting open of the first hollow section takes place by laser beam cutting.

4. The method according to claim 1, wherein the hollow sections are connected by welding or soldering.

5. The method according to claim 4, wherein welding or soldering is carried out using laser beam technology.

* * * * *

UNITED STATES PATENT AND TRADEMARK OFFICE
CERTIFICATE OF CORRECTION

PATENT NO. : 7,389,586 B2  Page 1 of 1
APPLICATION NO. : 10/507922
DATED : June 24, 2008
INVENTOR(S) : Lothar Patberg It is certified that error appears in the above-identified patent and that said Letters Patent is hereby corrected as shown below:

Title Pg, Item (73) Assignee: delete "Thyssenkrupp Steel AG" and replace it with --ThyssenKrupp Steel AG--.

Signed and Sealed this

Sixteenth Day of December, 2008

JON W. DUDAS
*Director of the United States Patent and Trademark Office*